(12) United States Patent
Tang et al.

(10) Patent No.: US 6,433,966 B1
(45) Date of Patent: Aug. 13, 2002

(54) ACTIVE REAR POSTS IMPROVED STICTION FLYABILITY SLIDER INTEGRATED PADS

(75) Inventors: Huan H. Tang, Cupertino; Jing Gui, Fremont, both of CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/616,764

(22) Filed: Jul. 14, 2000

Related U.S. Application Data

(60) Provisional application No. 60/144,548, filed on Jul. 15, 1999.

(51) Int. Cl.[7] .................................................. G11B 5/60
(52) U.S. Cl. ................................................... 360/235.4
(58) Field of Search ............................... 360/235.4–237

(56) References Cited

U.S. PATENT DOCUMENTS

| | | | |
|---|---|---|---|
| 4,605,977 A | 8/1986 | Matthews | 360/103 |
| 4,669,011 A | 5/1987 | Lemke | 360/103 |
| 5,021,906 A | 6/1991 | Chang et al. | 360/103 |
| 5,034,820 A | 7/1991 | Cho | 358/192.1 |
| 5,418,667 A | 5/1995 | Best et al. | 360/103 |
| 5,499,149 A | 3/1996 | Dovek | 360/103 |
| 5,508,861 A | 4/1996 | Ananth et al. | 360/103 |
| 5,550,691 A | 8/1996 | Hamiton | 360/103 |
| 5,661,618 A | 8/1997 | Brown et al. | 360/97.02 |
| 5,673,156 A | 9/1997 | Chen et al. | 360/97.01 |
| 5,729,399 A | 3/1998 | Albrecht et al. | 360/75 |
| 5,734,524 A | 3/1998 | Ruiz | 360/104 |
| 5,768,055 A | 6/1998 | Tian et al. | 360/103 |
| 5,898,541 A | 4/1999 | Boutaghou et al. | 360/109 |
| 5,943,189 A | 8/1999 | Boutaghou et al. | 360/103 |
| 5,959,801 A | 9/1999 | Gillis et al. | 360/75 |
| 5,963,396 A | 10/1999 | Burga et al. | 360/103 |
| 6,003,364 A | 12/1999 | Yao et al. | 73/105 |

OTHER PUBLICATIONS

Kasamatsu, Y., et al., "Stiction Free Slider for the Smooth Surface Disk", *IEEE Transactions on Magnetics*, vol. 31, No. 6, 5 pages, (Nov. 1995).

*Primary Examiner*—Robert S. Tupper
(74) *Attorney, Agent, or Firm*—Schwegman, Lundberg, Woessner & Kluth, P.A.

(57) ABSTRACT

An information handling system, such as a disc drive, including a base, a disc stack rotatably attached to the base, and an actuator assembly movably attached to the base. The actuator assembly also includes a load spring and a slider attached to said load spring. The slider for a disc drive includes a block of material having a leading edge, a trailing edge and an air-bearing surface. The air-bearing surface has at least one contact surface. Attached to the slider is at least one post for controlling the pitch of the slider. The post is movable between a first position and a second position. The post is attached to a piezoelectric element for moving the post between a first position and a second position. The post is actuated between the first position and the second position. In one embodiment of the invention, one post is attached to the trailing edge of the slider. In another embodiment of the invention, one post is attached to the first edge of the slider near the trailing edge and another post is attached to the second edge of the slider near the trailing edge.

30 Claims, 7 Drawing Sheets

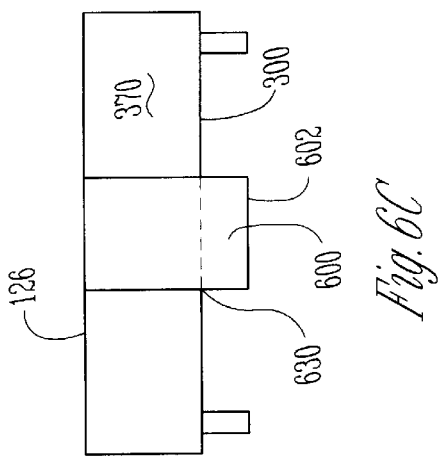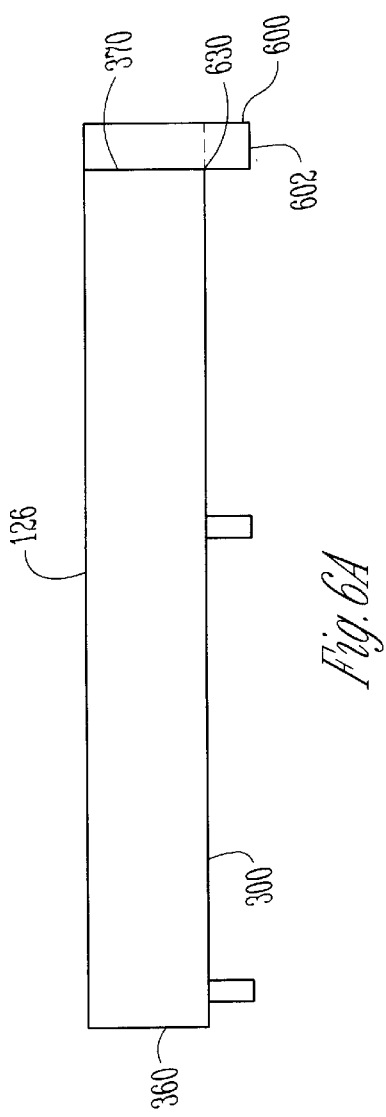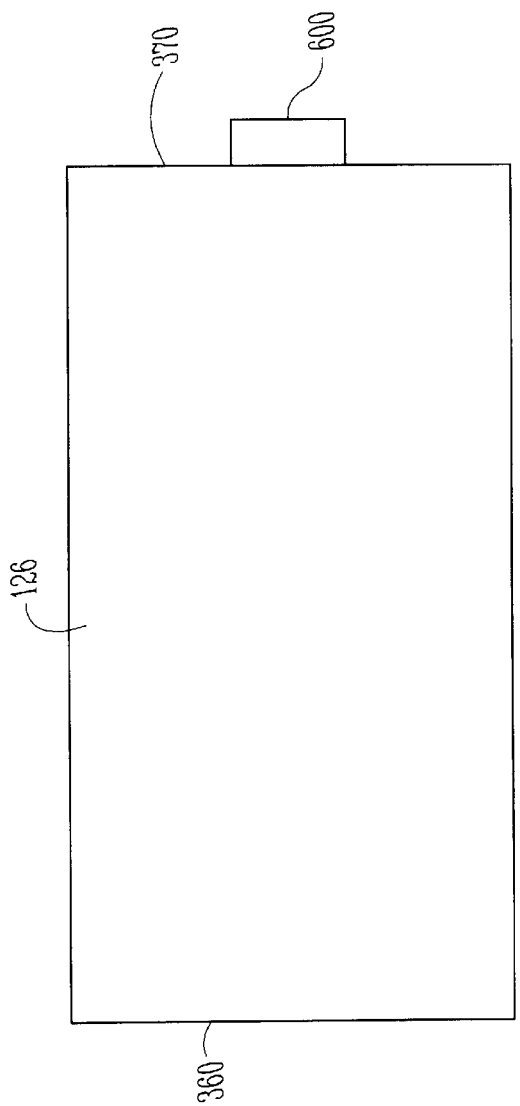

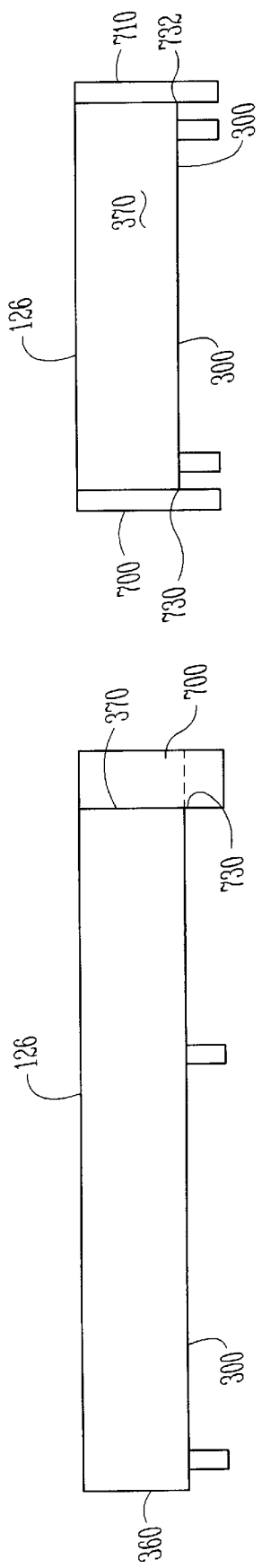
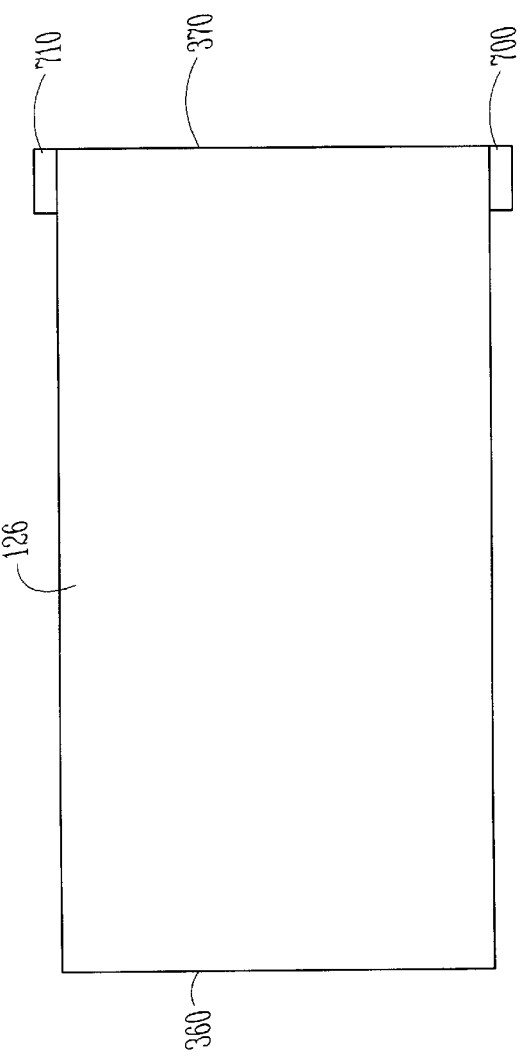

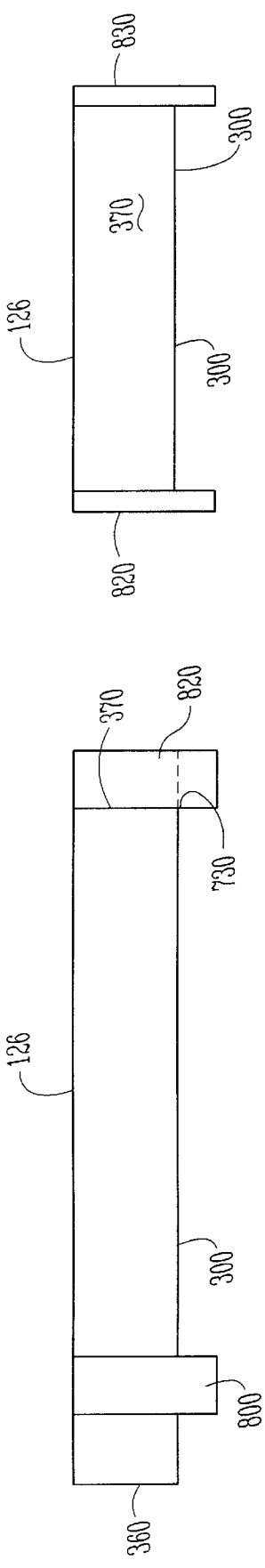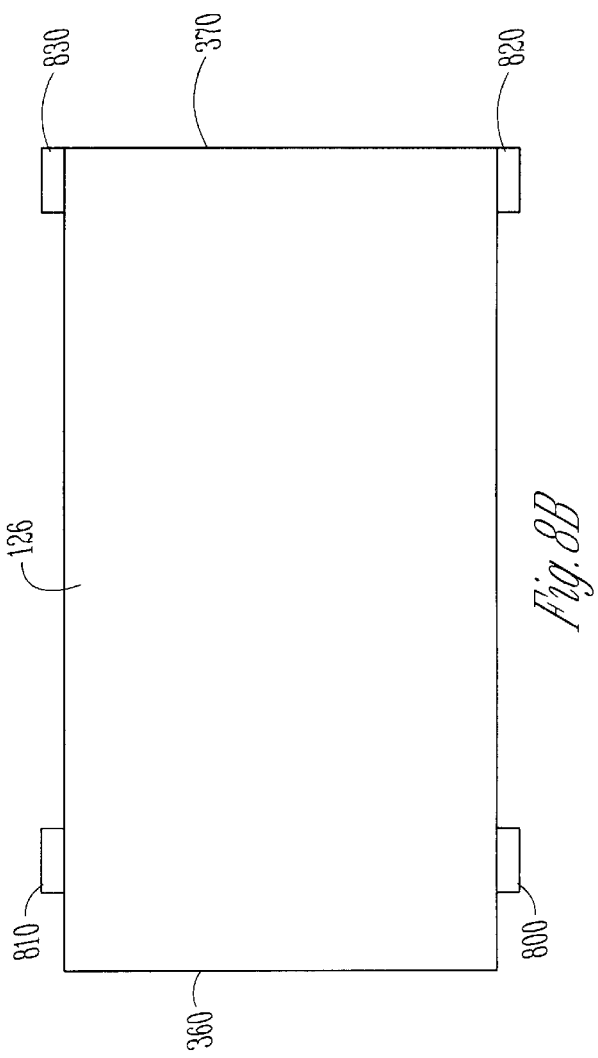

ACTIVE REAR POSTS IMPROVED STICTION FLYABILITY SLIDER INTEGRATED PADS

RELATED APPLICATION

This application claims the benefit of U.S. Provisional Application Ser. No. 60/144,548, filed Jul. 15, 1999 under 35 USC119(e).

FIELD OF THE INVENTION

The present invention relates to the field of mass storage devices. More particularly, this invention relates to a disc drive which includes a slider having a roughened air-bearing surface.

BACKGROUND OF THE INVENTION

One of the key components of any computer system is a place to store data. One common place for storing data in a computer system is on a disc drive. The most basic parts of a disc drive are a disc that is rotated, an actuator that moves a transducer to various locations over the disk, and electrical circuitry that is used to write and read data to and from the disk. The disc drive also includes circuitry for encoding data so that it can be successfully retrieved and written to the disc surface. A microprocessor controls most of the operations of the disc drive as well as passing the data back to the requesting computer and taking data from a requesting computer for storing to the disk. The magnetic transducer translates electrical signals into magnetic field signals that actually record the data "bits."

The transducer is typically housed within a small ceramic block called a slider. The slider is passed over the rotating disc in close proximity to the disk. The transducer can be used to read information representing data from the disc or write information representing data to the disk. When the disc is operating, the disc is usually spinning at relatively high revolutions per minute ("RPM"). A current common rotational speed is 7200 RPM. Rotational speeds in high-performance disc drives are as high as 10,000 RPM. Higher rotational speeds are contemplated for the future.

The slider is usually aerodynamically designed so that it flies on the cushion of air that is dragged by the disk. The slider has an air-bearing surface ("ABS") which includes rails and a cavity between the rails. The air-bearing surface is that surface of the slider nearest the disc as the disc drive is operating. Air is dragged between the rails and the disc surface causing an increase in pressure which tends to force the head away from the disk. Simultaneously, air rushing past the depression in the air-bearing surface produces a lower than ambient pressure area at the depression. This vacuum effect counteracts the pressure produced at the rails. The opposing forces equilibrate so the slider flies over the surface of the disc at a particular fly height. The fly height is the thickness of the air lubrication film or the distance between the disc surface and the transducing head. This film minimizes the friction and resulting wear that would occur if the transducing head and disc were in mechanical contact during disc rotation.

The best performance of the disc drive results when the slider is flown as closely to the surface of the disc as possible. In operation, the distance between the slider and the disc is very small; currently "fly" heights are about 1–2 micro inches.

Information representative of data is stored on the surface of the memory disk. Disc drive systems read and write information stored on tracks on memory disks. Transducers, in the form of read/write heads attached to the sliders, located on both sides of the memory disk, read and write information on the memory disks when the transducers are accurately positioned over one of the designated tracks on the surface of the memory disk. The transducer is also said to be moved to a target track. As the memory disc spins and the read/write head is accurately positioned above a target track, the read/write head can store data onto a track by writing information representative of data onto the memory disk. Similarly, reading data on a memory disc is accomplished by positioning the read/write head above a target track and reading the stored material on the memory disk. To write on or read from different tracks, the read/write head is moved radially across the tracks to a selected target track. The data is divided or grouped together on the tracks. In some disc drives, the tracks are a multiplicity of concentric circular tracks. In other disc drives, a continuous spiral is one track on one side of a disc drive. Servo feedback information is used to accurately locate the transducer. The actuator assembly is moved to the required position and held accurately during a read or write operation using the servo information.

One of the most critical times during the operation of a disc drive occurs just before the disc drive shuts down or during the initial moment when the disc drive starts. When shutdown occurs, the slider is typically flying over the disc at a very low height. Just before shutdown, the slider is moved to a non-data containing area of the disc where it is landed. During landing, the slider skids to a stop. When the disc drive starts, the slider skids across the non-data containing portion of the disc until the velocity of the slider is sufficient to produce lift between the slider and the disk.

In the past, the surface of the disc was textured to keep contact points between the disc and the slider to a minimum. Currently, it has been found that disks with smooth surfaces have better magnetic characteristics. The recording density of the disc is highest when the spacing between the transducing head and the magnetic layer is minimized. By reducing the roughness or texturing on the disk, the spacing between the transducing head and the magnetic layer on the disc can also be reduced. When smooth sliders are landed on disks formed with a smooth surface, problems occur. One of the larger problems is that a stiction force occurs between the slider and the disc surface. Stiction is static friction and is proportional to the size of a meniscus formed by the lubricant on the disk. When a smooth slider lands on a smooth disk, the stiction forces are high. In some instances, the stiction forces may cause the slider to separate from the suspension. In other words, the stiction forces may be so high that the slider rips from the suspension to which it is mounted.

One solution includes reducing the contact area of the air-bearing surface. However, even when this is done, frictional forces due to stiction remain and affect the performance of the air-bearing surface and slider. Evidence of air-bearing instability has been observed.

The slider includes an air-bearing surface which has a contact area. The slider also includes a transducer. The transducer is typically located near said contact area. Another solution is to texture or roughen the contact surface of the air bearing surface to reduce stiction between the slider and the disc surface. Some in the industry refer to texturing the contact areas as slider integrated pads (SLIP). The roughened surface portion of the contact area is formed in one of several ways. The slider integrated pad solution has been very successful in reducing the formation of stiction between the slider and represents a technology path towards future higher density recording. Even so, stiction problems may still be encountered using the slider integrated pads (SLIP).

Typically, the slider in a disc drive flies at a slight angle or pitch. Current designs of the air bearing surface recess the rails or rear pads from the trailing edge in order to get the transducer in closer proximity to the trailing edge. A center pad may also be recessed from the trailing edge of the slider.

Due to the considerable amount of recess of the rear pads from the trailing edge, however, the slider may rest on the disc in a backward tipped state. A tipped head permits the formation of a large, high pressure meniscus (or menisci) under the center rail, and in certain cases under the side rails as well. As a result of the large normal force arising from these menisci, the head disc interface experiences an excessively large stiction force, or stiction failure.

There are multitudes of mechanisms that may lead to slider tipping. Backward rotation of the disc prior to its coming to a full stop coupled with a sufficiently large frictional force can tip the slider backward and cause the head to remain in the tipped state if a sufficiently large meniscus is formed immediately. Alternatively, if the slider collects a sufficient amount of lube at the trailing edge during flying, then, the lube droplet(s) may bridge between the air-bearing surface near the trailing edge and the disc surface to form a meniscus (menisci) during rest dwell, and the resultant meniscus force may tip the slider. Also, spacing loss between the air-bearing surface and the disc surface at the tailing edge of the slider due to disc waviness or wear of the center pad wear may create a condition that facilitates slider tipping. Of course, if some or all of these mechanisms may be at work simultaneously, the probability of slider tipping will be increased.

For current SLIP designs with recessed rear rails, head tipping is unavoidable. In order to mitigate the high stiction problem when tipping does occur, a scheme solution is needed to reduce or eliminate the meniscus force. There is also a need for a solution to the tipping problem that would either reduce or, preferably, completely eliminate tipping.

There is also a need for a method and apparatus that allows for use of a smooth disc so that the spacing between the transducing head associated with the slider and the disc can be controlled and kept to a minimum to provide for an enhanced recording density of the information stored on the disk. There is also a need for an apparatus that provides for reduced stiction forces and yet still provides a stable air-bearing surface and slider. The apparatus and method must also provide an air-bearing that is rugged and durable enough to last for the life of the disc drive.

SUMMARY OF THE INVENTION

An information handling system, such as a disc drive, including a base, a disc stack rotatably attached to the base, and an actuator assembly movably attached to the base. The actuator assembly also includes a load spring and a slider attached to said load spring. The slider for a disc drive includes a block of material having a leading edge, a trailing edge and an air-bearing surface. The air-bearing surface has at least one contact surface. Attached to the slider is at least one post for controlling the pitch of the slider. The post is movable between a first position and a second position. The post is attached to a piezoelectric element for moving the post between a first position and a second position. The post is actuated between the first position and the second position. In one embodiment of the invention, one post is attached to the trailing edge of the slider. In another embodiment of the invention, one post is attached to the first side edge of the slider near the trailing edge and another post is attached to the second side edge of the slider near the trailing edge. In other embodiments, more active anti-tipping posts are attached to the slider to control the pitch of the slider and prevent stiction due to the formation of a meniscus at the trailing edge of a tipped slider.

A suspension assembly for use in a disc drive includes a load beam and a slider attached to the load beam such that the slider can pitch and roll. The slider includes a body of material having a leading edge, a trailing edge, a first side edge and a second side edge. A post movable between a first position and a second position attached to the slider. The post may be attached to the trailing edge of the slider or to one of the first side edge or second side edge of the slider. Moving the post between the first position and the second position controls the pitch of the slider. The post includes a piezoelectric element having a portion of which is attached to the body of the slider and another portion of which is attached to the pad. The invention reduces stiction between the contact surface of the slider and the disc of the disc drive.

Advantageously, the active anti-tipping posts 600, 700, 710, 820, 830 located at the trailing edge of a slider 126 will completely eliminate slider tipping, thereby providing a solution to the tipping related high stiction problem seen with SLIP heads. At the same time, the slider's flyability characteristics are preserved. Furthermore, the stiction forces produced between the surface of the disc and the slider are substantially reduced, thus allowing contact start stop of a slider onto a smooth disk. Furthermore, since a smooth disc can be used and stiction can be controlled enhanced recording densities may be achieved. The resulting air-bearing is rugged and durable.

BRIEF DESCRIPTION OF THE DRAWINGS

FIG. 6A is a side view of one embodiment of a slider having an active anti-tipping post.

FIG. 6B is a top view of one embodiment of the slider air-bearing having an active anti-tipping post.

FIG. 6C is a rear view of one embodiment of the slider air-bearing having an active anti-tipping post.

FIG. 7A is a side view of another embodiment of a slider having an active anti-tipping post.

FIG. 7B is a top view of another embodiment of the slider air-bearing having an active anti-tipping post.

FIG. 7C is a rear view of another embodiment of the slider air-bearing having an active anti-tipping post.

FIG. 8A is a side view of yet another embodiment of a slider having active anti-tipping posts.

FIG. 8B is a top view of yet another embodiment of the slider air-bearing having active anti-tipping posts.

FIG. 8C is a rear view of yet another embodiment of the slider air-bearing having active anti-tipping posts.

DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
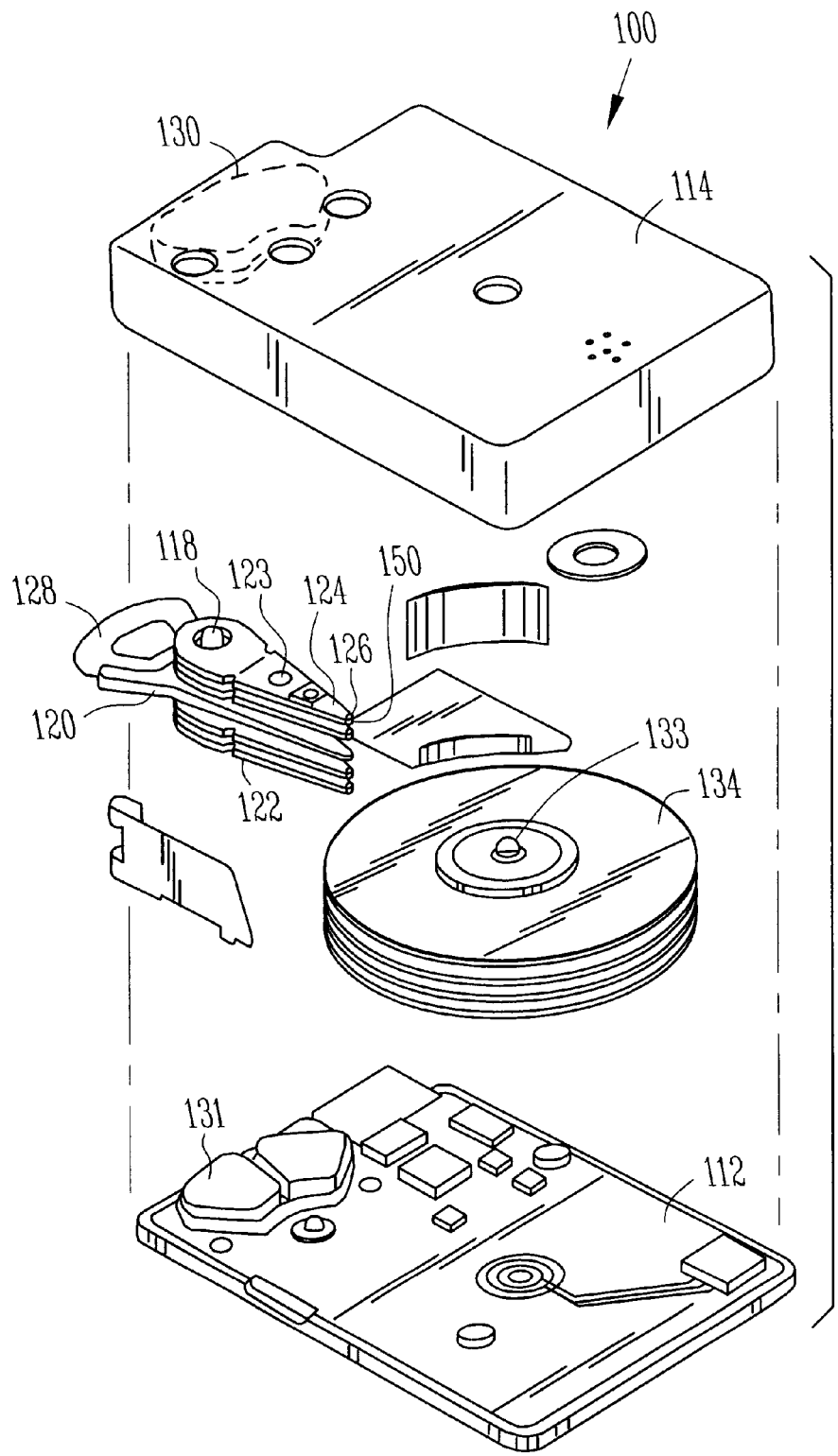
FIG. 1 is an exploded view of a disc drive with a multiple disc stack and a ramp assembly for loading and unloading transducers to and from the surfaces of the disks.

The invention described in this application is useful with all mechanical configurations of disc drives having either rotary or linear actuation. In addition, the invention is also useful in all types of disc drives including hard disc drives, zip drives, floppy disc drives and any other type of drives where unloading the transducer from a surface and parking the transducer may be desirable. FIG. 1 is an exploded view of one type of a disc drive 100 having a rotary actuator. The disc drive 100 includes a housing or base 112, and a cover 114. The base 112 and cover 114 form a disc enclosure. Rotatably attached to the base 112 on an actuator shaft 118 is an actuator assembly 120. The actuator assembly 120 includes a comb-like structure 122 having a plurality of arms 123. Attached to the separate arms 123 on the comb 122, are load beams or load springs 124. Load beams or load springs are also referred to as suspensions. Attached at the end of each load spring 124 is a slider 126 which carries a magnetic transducer 150. The slider 126 with the transducer 150 form what is many times called the head. It should be noted that many sliders have one transducer 150 and that is what is shown in the figures. It should also be noted that this invention is equally applicable to sliders having more than one transducer. Also attached to the load spring is a load tang 152. The load tang 152 is used for loading sliders 126 to the disc 134 and unloading the sliders 126 from the disk. On the end of the actuator arm assembly 120 opposite the load springs 124 and the sliders 126 is a voice coil 128.

Attached within the base 112 is a pair of magnets 130 and 130'. The pair of magnets 130 and 130', and the voice coil 128 are the key components of a voice coil motor which applies a force to the actuator assembly 120 to rotate it about the actuator shaft 118. Also mounted to the base 112 is a spindle motor. The spindle motor includes a rotating portion called the spindle hub 133. In this particular disc drive, the spindle motor is within the hub. In FIG. 1, a number of disks 134 are attached to the spindle hub 133. In other disc drives a single disc or a different number of disks may be attached to the hub. The invention described herein is equally applicable to such other disc drives.

Figure 2:
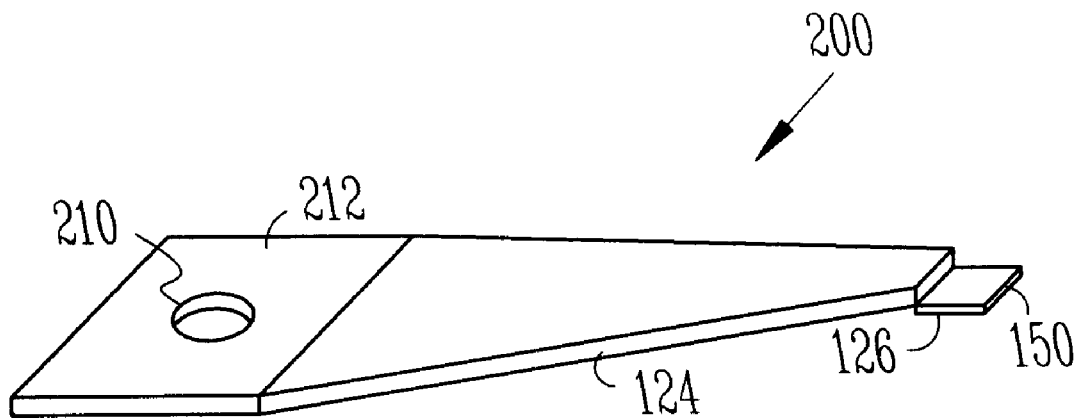
FIG. 2 is a perspective view of a load spring and an attached slider which form a head gimbal assembly.

FIG. 2 is a perspective view of a load spring 124 and attached slider 126 which form a head gimbal assembly 200. The load spring 124 is a triangular structure which acts as a cantilevered spring to place a small load onto the slider 126 when the slider 126 is in transducing relation with the disc 134. Load springs 124 are also commonly called load beams or suspensions by many in the disc drive industry. The load spring 124 is attached at its wider end to an actuator arm 123. The load spring 124 shown in FIG. 2 has a swage opening 210 and a swage plate 212 in the wider end. The swage opening 210 and swage plate 212 are used to attach the load spring 124 by a process referred to as swaging. Other attachment methods may also be used without departing from the spirit of this invention. Also attached to the load spring 124 is the slider 126. The transducer 150 is carried by or within the slider 126.

Moving the actuator assembly 120 moves all the load springs 124. In operation, the actuator assembly 120 is moved to a park position when the disc drive is powered down. Moving the actuator to the park position causes the sliders to move to a non-data area of the disk. The non-data area is typically at the inner diameter ("ID") of the disc 134. Once the actuator assembly 120 has moved the sliders 126 to the park position, the disc drive is powered down and the sliders land on the non-data area and skid to a halt. When the disc drive is powered on, the disks 134 are quickly accelerated until a relative velocity between the sliders 126 and the disc 134 is produced which causes the slider to lift off the surface of the disc 134. Once lift off of the slider 126 has occurred, the actuator assembly can be used to move the sliders 126 into an operating or transducing position over the area of the disc used to store information representative of data. The actuator assembly 120 can also be used to perform seeks to various data locations on the surface of the disk.

Figure 3:
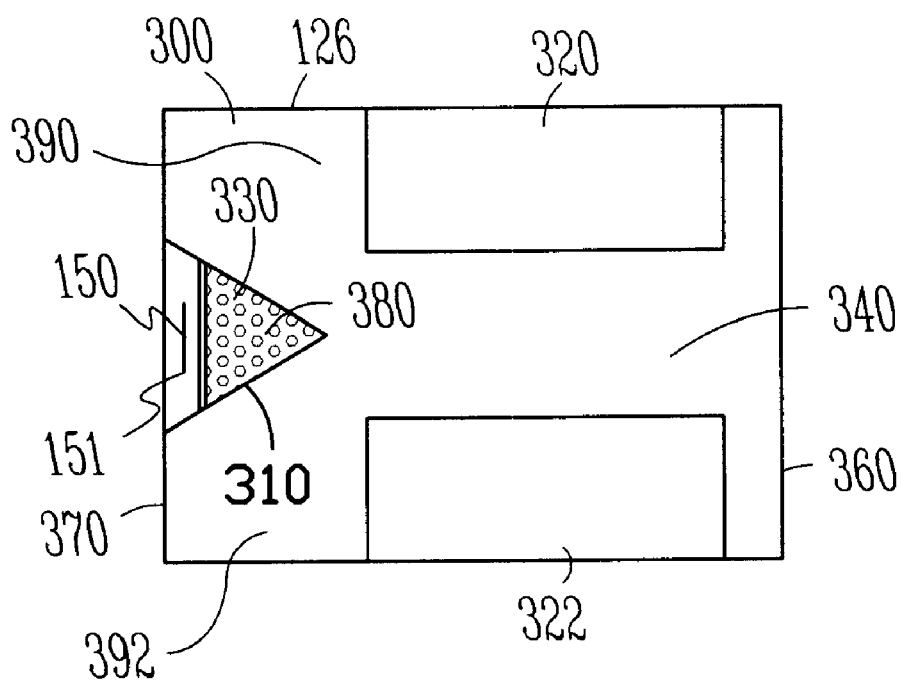
FIG. 3 is a bottom view of a slider showing the air-bearing surface with recessed rear pads and a recessed center island.

FIG. 3 is a bottom view of a slider 126 showing an air-bearing surface 300. The air-bearing surface includes a center island 310, a first side rail 320 and a second side rail 322. The air-bearing surface 300 includes contact portions which contact the disc 134 during take-off and landing of the slider 126 and noncontact portions which do not normally contact the disc 134. The center island 310 is a contact portion 330. Other portions of the air-bearing surface such as the side rails 320 and 322 may also be contact portions. A cavity is typically formed between the side rails 320 and 322 as well as the center island 310. The cavity 340 is a noncontact portion of the air-bearing surface 300. As can be seen, the side rails 320 and 322 do not extend to the trailing edge. The side rails 320, 322 are recessed from the trailing edge 370. The area between the side rail 320 and the trailing edge 370 is a first recess area 390. The area between the side rail 322 and the trailing edge 370 is a first recess area 392. The slider also has a leading edge 360 and a trailing edge 370. Positioned at or near the trailing edge 370 is the transducer 150. As shown in FIG. 3, the transducer fits within a slot 151 within the center island 310.

The side rails 320 and 322 may include patterns of diamond-like carbon, which are used to minimize stiction between the side rails 320 and 322 of the air-bearing surface 300 and the disc 134. These diamond-like carbon pads are generally placed so that they will not interfere with the spacing between the transducer 150 and the disk. As a result, the diamond-like pads will not interfere with the contact surface, such as 380, which is near the transducer 150. If the contact pads were placed too close to the transducer, the flying height of the transducer with respect to the disc 134 would be changed.

Figure 4:
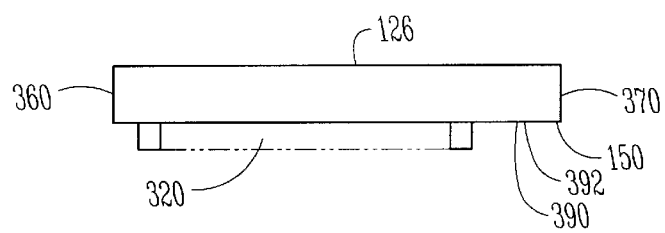
FIG. 4 is a side diagrammatic view showing the recessed contact areas of the air-bearing surface of the slider.
Figure 5:
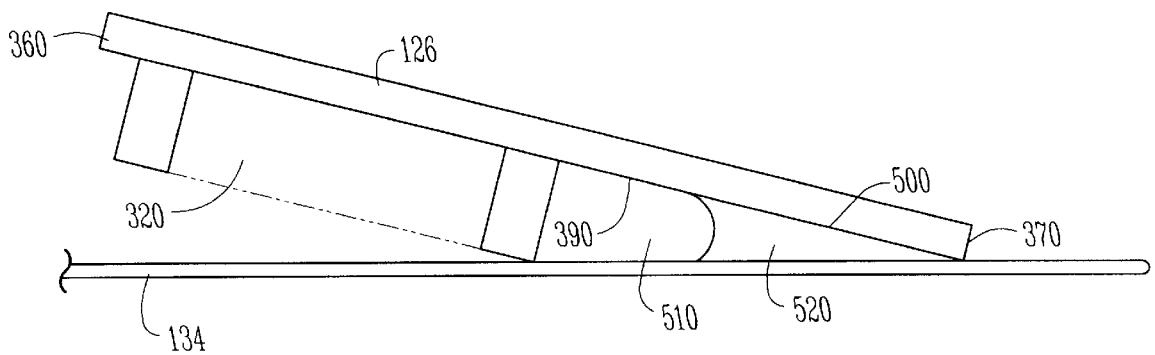
FIG. 5 is a side diagrammatic view showing meniscus of lubricant that may be formed when the slider is tipped backward on the disc.

FIG. 4 is a side diagrammatic view showing the recessed areas 390, 392 of the air-bearing surface 300 of the slider 126. Side rail 320 is recessed in that the rail 320 does not extend all the way back to the trailing edge 370. FIG. 5 is a side diagrammatic view of the of the slider of FIG. 4 in a tipped condition and showing meniscus of lubricant that may be formed when the slider is tipped backward with respect to the disc 134.

Due to the considerable amount of recess of the rear pads from the trailing edge, however, the slider may rest on the disc in a backward tipped state, as illustrated in FIG. 5. A tipped head permits the formation of a large, high pressure menisci 500 under the center rail 330 (see FIGS. 3, 4 and 5), and in certain cases under the side rails as well. As a result of the large normal force arising from these menisci 500, the head disc interface 510 experiences an excessively large stiction force, or stiction failure.

There are multitudes of mechanisms that may lead to slider tipping. Backward rotation of the disc 134 prior to its coming to a full stop coupled with a sufficiently large frictional force can tip the slider 126 backward and cause the head to remain in the tipped state if a sufficiently large meniscus 500 is formed immediately. Alternatively, if the slider 126 collects a sufficient amount of lube 520 at the trailing edge 370 during flying 134, then, the lube droplet(s) (not shown) may bridge between the air-bearing surface 300 near the trailing edge 370 and the disc surface 134 to form a meniscus (menisci) 500 during rest dwell, and the resultant meniscus force may tip the slider 126. Also, spacing loss between the air-bearing surface 300 and the disc surface 134 at the tailing edge 360 of the slider due to disc 134 waviness or rear of the center pad wear may create a condition that facilitates slider tipping. Of course, if some or all of these mechanisms are at work simultaneously, the probability of slider tipping will be increased.

For current SLIP designs with recessed rear rails, head tipping is unavoidable. In order to mitigate the high stiction problem when tipping does occur, a scheme solution is needed to reduce or eliminate the meniscus force. There is also a need for a solution to the tipping problem that would either reduce or completely eliminate tipping.

In order to control the slider 126 tipping, an anti-tipping mechanism is provided on the slider 126. FIGS. 6A, 6B and 6C show a first embodiment of the slider 126 having an active anti-tipping post 600 attached to the trailing edge of the slider 126. The active anti-tipping post 600 is capable of at least two positions. As shown in FIGS. 6A, 6B, and 6C, the active anti-tipping post 600 is shown in an extended position. The active anti-tipping post 600 is also capable of a retracted position which is represented by a dotted line 630 in FIGS. 6A and 6C. FIG. 6A is a side view of the first embodiment of a slider having an active anti-tipping post 600. FIG. 6B is a top view of the slider 126 air-bearing having an active anti-tipping post 600 shown in FIG. 6A. FIG. 6C is a rear view of the first embodiment of the slider 126 air-bearing having an active anti-tipping post 600.

In the first embodiment, the active anti-tipping post 600 is located at the trailing edge 370 of the slider 126. The anti-tipping post 600 is attached to the trailing edge 370 using a piezoelectric transducer (PZT) actuator (shown and described in more detail in FIG. 8). Placing an electrical bias across the piezoelectric transducer actuator acts to retract the anti-tipping post 600. When the bias to the piezoelectric transducer (PZT) is removed, the anti-tipping post extends to an extended position beyond the air-bearing surface. When in the extended position, the anti-tipping post passes through a plane including the air-bearing surface (an extension of the air-bearing surface). When the head is at rest, the bias to the PZT actuators is removed and the active anti-tipping post 600 extends beyond the ABS 300 by about 350 Å, thereby preventing tipping of the slider 126. When the slider 126 is flying, an appropriate bias is applied to the PZT actuators to retract the active anti-tipping post 600 to a position above the ABS 300 so that they will not affect the slider's 126 flyability. The post 600 includes a land pad surface 602. To increase the wear durability of the active anti-tipping post 600, diamond-like carbon (DLC) of 300–500 Å in thickness is deposited on the landing pad surface. Of course, different thicknesses of DLC can be used without departing from the spirit of the invention. Furthermore, the material is not limited to DLC. Another hard, highly wearable material is also contemplated.

To further minimize wear, sliding contact of the active pads with the disc can be minimized during start by applying a bias to the PZT, to place the anti-tipping post 600 in a retract position, shortly after the disc 134 begins to spin. Similarly, the bias on the PZT transducer is removed shortly before the disc stops spinning, thereby placing the post in an extended position and preventing or greatly reducing stiction problems due to slider or head tipping.

FIGS. 7A, 7B and 7C show a second embodiment of the slider 126 having a first active anti-tipping post 700 attached to a first edge of the slider 126 near the trailing edge 370 and having a second active anti-tipping post 710 attached to a second edge of the slider 126 near the trailing edge 370. The active anti-tipping posts 700, 710 are each capable of at least two positions. As shown in FIGS. 7A, 7B, and 7C, the active anti-tipping posts 700, 710 are shown in extended positions. The active anti-tipping posts 700, 710 are also capable of a retracted position which is represented by a dotted lines 730, 732 on the respective posts 700, 710 in FIGS. 7A and 7C. FIG. 7A is a side view of the second embodiment of a slider having active anti-tipping posts 700, 710. FIG. 7B is a top view of the second embodiment of the slider 126 having the active anti-tipping posts 700, 710, and FIG. 7C is a rear view of the second embodiment. Each anti-tipping post 700, 710 has a landing surface or landing pad 702 and 712, respectively. The landing surface or landing pad 702, 712 on the end of the posts 700, 710 have a layer of DLC or similar material to increase the wear characteristics of the posts 700, 710. The operation of the anti-tipping posts 700, 710 is the same as the operation of the anti-tipping post 600 so the details of operation will not be repeated here.

FIGS. 8A, 8B, and 8C shows a third embodiment of the invention. In this particular embodiment, there are four active posts 800, 810, 820, 830 attached to the slider 126. Two posts 800 and 810 are located near or at the leading edge 360 of the slider 126 and two of the posts are located near the trailing edge 370 of the slider 126. Posts 800, 810, 820 and 830 are substantially identical to the active anti-tipping posts 600, 700, 710 already described. Any configuration of anti-tipping posts is also contemplated. For example, three anti-tipping posts could also be used on a slider since three points define a plane.

Figure 9:
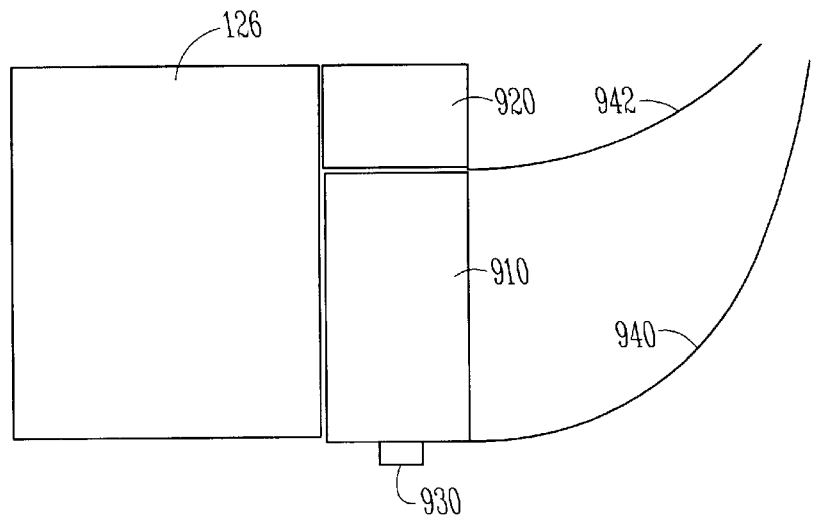
FIG. 9 is an illustration of one of the active anti-tipping posts shown in FIGS. 6A to 7C.

FIG. 9 is an illustration of one of the active anti-tipping posts shown in FIGS. 6A–6C, 7A–7C and 8A–8C. FIG. 9 shows a close-up view of an active post 600, 700, 710, 800, 810, 820, 830 and details the attachment of the anti-tipping post to the slider 126. The PZT actuator 910 is sandwiched between a mounting block 920 and a thin DLC landing pad 930. The mounting block 920 may be made of an insulating material such as alumina. The bonding between the PZT piece 910 and the mounting block 920, and between the mounting block 920 and the slider body 120, may be made with the same adhesive that is used to bond the slider to the suspension. A first bias lead 940 is placed in electrical communication with one end of the PZT actuator 910 and a second bias lead 942 is placed in electrical communication with the other end of the PZT actuator 910. In one preferred embodiment, the PZT actuator could be 100–150 $\mu$m in length. A bias of a few volts that is compatible with hard drive electronics should be adequate to cause the actuator 910 to contract by about 500 Å. The size of the DLC landing pad 930 could be approximately 2000 $\mu m^2$ for a single active post embodiment or 1000 $\mu m^2$ for a double-post design embodiment. Of course, various PZT dimensions and bias currents are contemplated. The dimensions of the PZT actuator 910 may very well become smaller as sliders of smaller size are used. In addition, the cross section of the PZT actuator 910 may also be changed.

Advantageously, the active anti-tipping posts 600, 700, 710, 820, 830 located at the trailing edge of a slider 126 will completely eliminate slider tipping, thereby providing a solution to the tipping related high stiction problem seen with SLIP heads. At the same time, the slider's flyability characteristics are preserved. Furthermore, the stiction forces produced between the surface of the disc and the slider are substantially reduced or eliminated, thus allowing contact start stop of a slider onto a smooth disk. Furthermore, since a smooth disc can be used and stiction can be controlled enhanced recording densities may be achieved. The resulting air-bearing is rugged and durable.

Figure 10:
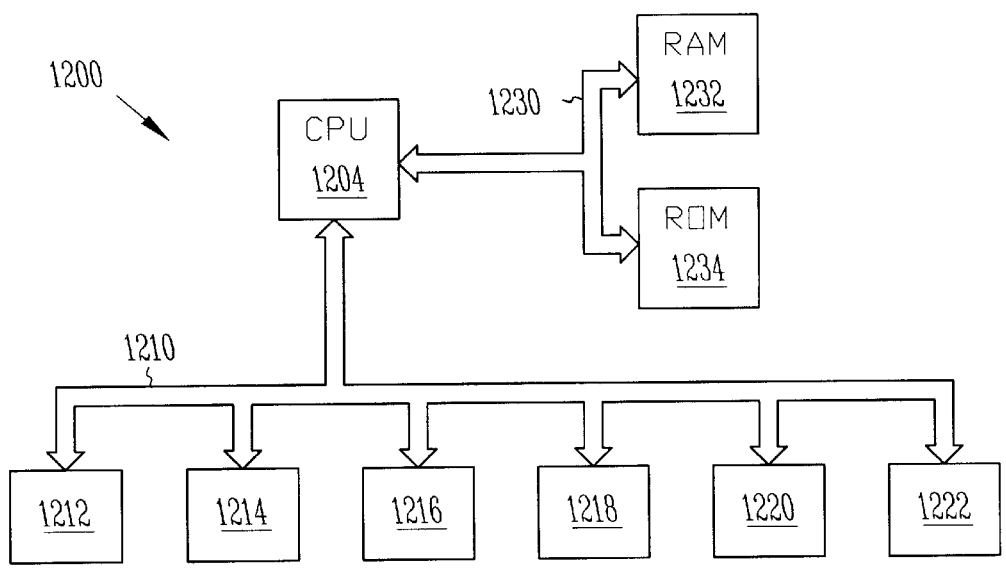
FIG. 10 is a schematic view of a computer system.

FIG. 10 is a schematic view of a computer system. Advantageously, the invention is well-suited for use in a computer system 1200. The computer system 1200 may also be called an electronic system or an information handling system and includes a central processing unit, a memory and a system bus. The information handling system includes a central processing unit 1204, a random access memory 1232, and a system bus 1230 for communicatively coupling the central processing unit 1204 and the random access memory 1232. The information handling system 1202 includes a disc drive device. The information handling system 1202 may also include an input/output bus 1210 and several devices peripheral devices, such as 1212, 1214, 1216, 1218, 1220, and 1222 may be attached to the input output bus 1210. Peripheral devices may include hard disc drives, magneto optical drives, floppy disc drives, monitors, keyboards and other such peripherals. Any type of disc drive may use the slider having the surface treatment discussed above.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A slider for a disc drive information handling system comprising: a block of material further comprising:
    a leading edge;
    a trailing edge; and
    an air-bearing surface further comprised of at least one contact surface; and
    at least one post for controlling the pitch of the slider to prevent the trailing edge of the slider from contacting a surface.

2. The slider of claim 1 wherein the at least one post is movable between a first position and a second position.

3. The slider of claim 1 wherein the at least one post is actuated between a first position and a second position.

4. The slider of claim 1 wherein the at least one post is attached to a piezoelectric element for moving the post between a first position and a second position.

5. The slider of claim 2 wherein the at least one post extends through an air bearing surface plane which includes the air-bearing surface of the slider when the at least one post is in one of the first position or the second position.

6. The slider of claim 5 wherein the at least one post further includes a pad surface which remains substantially parallel to an air bearing surface plane which includes the air-bearing surface of the slider as the at least one plane is moved between a first position and a second position, wherein the pad surface of the at least one post is substantially coplanar with the air bearing surface when the at least one post is in the other of the first position or the second position.

7. The slider of claim 5 wherein the at least one post further includes a pad surface which remains substantially parallel to an air bearing surface plane which includes the air-bearing surface of the slider as the at least one plane is moved between a first position and a second position, wherein the pad surface of the at least one post is on the other side of the air bearing surface plane when the at least one post is in the other of the first position or the second position.

8. The slider of claim 2 wherein the at least one post is attached to the trailing edge of the slider.

9. The slider of claim 2 wherein the slider further comprises
    a first side edge; and
    a second side edge, the at least one post is attached to one of the first or second side edges of the slider.

10. The slider of claim 1 wherein the slider further comprises;
    a first side edge;
    a second side edge; and
    a plurality of posts for controlling the pitch of the slider, each of the plurality of posts movable between a first position and a second position, wherein one of the plurality of posts is attached to a first side edge and wherein another of the plurality of posts is attached to the second side edge of the slider.

11. The slider of claim 10 wherein the one or the other of the plurality of posts is movable between a first position and a second position.

12. The slider of claim 10 wherein the one or the other of the plurality of posts is actuated between a first position and a second position.

13. The slider of claim 10 wherein the one or the other of the plurality of posts is attached to a piezoelectric element for moving the post between a first position and a second position.

14. The slider of claim 10 wherein both the one and the other of the plurality of posts is actuated between a first position and a second position, each of the one and the other of the plurality of posts attached to a piezoelectric element for moving the post between the first position and the second position.

15. The slider of claim 1 further comprising:
    a first side edge between the leading edge and the trailing edge;
    a second side edge between the leading edge and the trailing edge, wherein the at least one post for controlling the pitch of the slider to prevent the trailing edge of the slider from contacting a surface is attached to one of the first side edge and the second side edge.

16. The slider of claim 1 wherein the at least one post for controlling the pitch of the slider is attached to the trailing edge of the slider.

17. A suspension assembly for use in a disc drive comprising:
    a load beam;
    a slider attached to the load beam such that the slider can pitch and roll, the slider further comprising a body of material having:

a leading edge;
a trailing edge;
a first side edge; and
a second side edge; and a post movable between a first position and a second position attached to the slider, the post positioned on the slider to prevent the trailing edge of the slider from contacting a surface.

18. The suspension assembly of claim 17 wherein the post is attached to the trailing edge of the slider.

19. The suspension assembly of claim 17 wherein the post is attached to one of the first side edge or second side edge of the slider.

20. The suspension assembly of claim 17 wherein moving the post between a first position and a second position controls the pitch of the slider.

21. The suspension assembly of claim 17 further comprising a piezoelectric element a portion of which is attached to the body of the slider and another portion of which is attached to the pad.

22. A slider for passing over the surface of a disc in a disc drive information handling system, the slider comprising:

a block of material further comprising:
a leading edge;
a trailing edge; and
an air-bearing surface a contact surface; and of the at least one means for reducing stiction between the contact surface and the disc of the disc drive.

23. The slider for passing over the surface of a disc in a disc drive information handling system of claim 22 wherein the means for reducing stiction includes a post positioned on the block of material to prevent the trailing edge from contacting the surface of the disc.

24. The slider for passing over the surface of a disc in a disc drive information handling system of claim 22 wherein the means for reducing stiction includes a post capable of a first position and a second position, wherein when the post is in one of the first position or the second position, the post prevents the trailing edge of the block of material from contacting the surface of the disc.

25. The slider for passing over the surface of a disc in a disc drive information handling system of claim 24 wherein the post capable of a first position and a second position includes a piezo-electric element.

26. The slider for passing over the surface of a disc in a disc drive information handling system of claim 24 wherein the post capable of a first position and a second position is attached to the trailing edge of the block of material.

27. The slider for passing over the surface of a disc in a disc drive information handling system of claim 24 wherein the block of material further comprises:

a first side edge located between the leading edge and the trailing edge; and a second side edge located between the leading edge and the trailing edge, the post capable of a first position and a second position is attached to one of the first side edge or the second side edge.

28. The slider for passing over the surface of a disc in a disc drive information handling system of claim 27 wherein the post capable of a first position and a second position is attached proximate the trailing edge.

29. The slider for passing over the surface of a disc in a disc drive information handling system of claim 24 wherein the block of material further comprises:

a first side edge located between the leading edge and the trailing edge; and a second side edge located between the leading edge and the trailing edge, wherein a first post capable of a first position and a second position is attached to the first side edge and a second post capable of a first position and a second position is attached to the second side edge.

30. The slider for passing over the surface of a disc in a disc drive information handling system of claim 29 wherein the first post capable of a first position and a second position is attached proximate the trailing edge, and the second post capable of a first position and a second position is attached proximate the trailing edge.

* * * * *